(12) United States Patent
Egerer et al.

(10) Patent No.: US 8,216,501 B2
(45) Date of Patent: Jul. 10, 2012

(54) PROCESS FOR PRODUCING MOLDED PARTS, IN PARTICULAR DECORATIVE PART AND/OR TRIM PART FOR THE PASSENGER COMPARTMENT OF A VEHICLE

(75) Inventors: Gerhard Egerer, Trabitz (DE); Roland Schwenk, Creußen (DE); Christian Vogler, Pottenstein (DE)

(73) Assignee: Novem Car Interior Design GmbH, Vorbach (DE)

( * ) Notice: Subject to any disclaimer, the term of this patent is extended or adjusted under 35 U.S.C. 154(b) by 1031 days.

(21) Appl. No.: 12/122,411

(22) Filed: May 16, 2008

(65) Prior Publication Data

US 2008/0292851 A1 Nov. 27, 2008

(30) Foreign Application Priority Data

May 24, 2007 (EP) .................................. 07010333

(51) Int. Cl.
B29C 45/14 (2006.01)
(52) U.S. Cl. ......... 264/259; 264/261; 264/266; 264/279
(58) Field of Classification Search .................. 264/257, 264/259, 261, 266, 279, 46.5, 46.7, 46.8
See application file for complete search history.

(56) References Cited

U.S. PATENT DOCUMENTS

| | | | |
|---|---|---|---|
| 5,037,591 A * | 8/1991 | Rohrlach et al. | 264/46.5 |
| 5,076,880 A | 12/1991 | Spengler et al. | |
| 5,180,617 A | 1/1993 | Takeuchi et al. | |
| 5,582,789 A * | 12/1996 | Stein et al. | 264/46.4 |
| 5,626,382 A | 5/1997 | Johnson et al. | |
| 5,993,719 A | 11/1999 | Abe et al. | |
| 6,291,369 B1 * | 9/2001 | Yoshikawa et al. | 442/58 |
| 6,887,413 B1 | 5/2005 | Schumacher | |
| 6,887,572 B2 | 5/2005 | Atake | |
| 2002/0142181 A1 | 10/2002 | Atake | |

FOREIGN PATENT DOCUMENTS

| | | |
|---|---|---|
| DE | 3800218 A1 | 7/1989 |
| DE | 10031696 A1 | 1/2002 |
| DE | 10107269 A1 | 8/2002 |
| DE | 69714184 T2 | 2/2003 |
| DE | 10346730 A1 | 5/2005 |
| DE | 102004006487 A1 | 9/2005 |
| DE | 102004014682 A1 | 10/2005 |
| DE | 102005011474 A1 | 9/2006 |
| DE | 202007002629 U1 | 4/2007 |
| EP | 0949052 A | 10/1999 |
| GB | 2314290 A | 10/1996 |
| JP | 10034683 A | 2/1998 |
| WO | WO0238352 A2 | 5/2002 |

* cited by examiner

Primary Examiner — Jill Heitbrink
(74) Attorney, Agent, or Firm — Workman Nydegger

(57) ABSTRACT

Implementations of the present invention relate to a molded part, in particular a decorative part and/or a trim part for the passenger compartment of a vehicle, comprising a support of plastic, a decorative layer and a ductile insert of ductile material. According to implementations of the present invention, the ductile material for forming the ductile insert is or comprises a nonmetallic mat, in particular a textile mat or a prepreg mat. Implementations of the present invention also relate to an injection molding process and a compression molding process for producing molded parts, in particular decorative parts and/or trim parts for the passenger compartment of a vehicle, the molded parts comprising a support of plastic, a decorative layer and a ductile insert of ductile material.

8 Claims, 14 Drawing Sheets

PROCESS FOR PRODUCING MOLDED PARTS, IN PARTICULAR DECORATIVE PART AND/OR TRIM PART FOR THE PASSENGER COMPARTMENT OF A VEHICLE

CROSS-REFERENCE TO RELATED APPLICATIONS

The present invention claims the benefit of priority to European Patent Application No. 07 010 333.8, filed May 24, 2007, entitled "Molded Part, In Particular Decorative Part And/Or Trim Part For The Passenger Compartment Of A Vehicle, And Process For Producing Molded Parts," the entire contents of which are incorporated by reference herein.

BACKGROUND OF THE INVENTION

1. The Field of the Invention

The invention relates to a molded part, in particular a decorative part and/or a trim part for the passenger compartment of a vehicle, and to an injection molding process and a compression molding process for producing molded parts, in particular decorative parts and/or trim parts for the passenger compartment of a vehicle.

2. Background and Relevant Art

Molded parts for a passenger compartment of a vehicle generally comprise a support of plastic, a decorative layer and a ductile insert of ductile material. The decorative layer may extend over the entire molded part, but it is similarly possible for it only to be assigned to a partial region of the molded part. The same applies to the ductile insert. It may extend at least to the greatest extent in or over the entire molded part, but it may also only be provided in a partial region of the molded part.

Such molded parts are fitted in the passenger compartment of a vehicle, in particular in areas in which the impact of a driver or passenger is to be expected in an accident. The insert is intended here to ensure the overall deformability of the molded part, i.e., as far as possible prevent it from rupturing or cracking on impact.

Such parts are known per se; a metal is used as the ductile insert, in particular an aluminum or steel sheet. However, these metals are relatively heavy and consequently contribute correspondingly to the overall weight of the vehicle; their properties also do not always meet the desired requirements with respect to strength and elasticity.

Various production processes are known for the production of decorative or trim parts for the passenger compartment of a vehicle which merely comprise a decorative layer (which however may have in addition to the actual decorative ply further structural and/or adhesive plies) and a support of plastic. According to a first variant, first the decorative layer is pressed into the desired form in a compression mold, so that it forms a decorative shell. Subsequently, the preformed decorative layer or the decorative shell is laminated with a film of plastic molding compound in an injection mold to form the support. According to a second variant, first the support is formed in an injection mold and subsequently the sheet-like material is pressed onto the support in a compression mold to form the decorative layer. Alternatively, according to a third variant, the preformed decorative shell is placed together with a plastic molding compound into a compression mold and the molded part is produced in it by means of pressing. According to a fourth variant, first the support is formed in a compression mold and subsequently the sheet-like material is pressed onto the support in a compression mold to form the decorative layer. These processes consequently already require in each case at least two separate process steps, which are carried out on different molds. Consequently, the processes are time-consuming and labor-intensive and are consequently correspondingly cost-intensive.

This applies all the more to processes developed on this basis for producing the molded parts mentioned at the beginning which additionally have a ductile insert of ductile material. This ductile insert must be additionally bonded or pressed onto the molded part.

According to a known process, the production of these molded parts is based on the aforementioned second variant. The difference is that, before the formation of the support in the injection mold, first the ductile material forming the insert is introduced into the cavity of the mold and positioned, and then, after closing the cavity, the plastic molding compound is applied to it by injection. In this first step, consequently, a composite unit comprising the plastic support and the insert of ductile material is created. Subsequently, as in the previously described second variant, the sheet-like material is pressed onto the support in a compression mold to form the decorative layer.

BRIEF SUMMARY OF THE INVENTION

The present invention is based on the object of providing an alternative molded part with a ductile insert that has improved properties, in particular with regard to weight and/or strength and/or elasticity. Furthermore, improved processes for producing molded parts with a ductile insert are to be provided. In particular, these processes are intended to increase productivity and lower production costs.

This object is achieved with respect to the molded part by the features of the independent apparatus and process claims herein. Advantageous refinements and developments are specified in the correspondingly dependent apparatus and process claims herein.

In the case of the molded part according to the invention, the ductile material for forming the ductile insert is or comprises a nonmetallic mat, in particular a textile mat or a prepreg mat.

Textile mats are technical textiles, i.e., they are produced from fibers. They are stable and at the same time flexible, have great strength and a high modulus of elasticity and are lightweight, for example in comparison with metals. "Prepreg" is short for "pre-impregnated fibers". Prepregs comprise woven or laid fiber structures that are impregnated with resins, for example woven or laid long-fiber structures, continuous fibers laid in the form of loops or combinations thereof. Carbon fibers, glass fibers, natural fibers and synthetic fibers such as aramid fibers are suitable for example as the fiber type. Epoxy, polyester and phenolic resin come into consideration, inter alia, as the resin. The fiber type in particular determines the strength and modulus of elasticity of the prepreg, and consequently of the prepreg mat, as important properties. Prepreg mats are stable, have great strength and a high modulus of elasticity and are lightweight, for example in comparison with metals.

Accordingly, the advantages of the molded part according to the invention are in particular their light weight, in particular in comparison with the use of metal as a ductile material for forming the ductile insert. Furthermore, the molded part has altogether high strength with at the same time great elasticity, in particular once again in comparison with the use of metal as the ductile material for forming the ductile insert.

The mats that are used according to the invention for forming the ductile insert are supplied, for example, on rolls or in sheet form and are correspondingly used in the production of the molded parts. Typical material thicknesses of the mats lie in the range from 0.2 mm to 2.0 mm, in particular around 0.5 mm. The mats may be impregnated, for example with materials based on epoxy, acrylic or unsaturated polyester resins.

According to a first variant, the process according to the invention for producing the molded parts mentioned at the beginning, in particular the aforementioned molded parts according to the invention, is an injection molding process. This involves placing a material forming the decorative layer and the ductile material for forming the ductile insert in an opened cavity of an injection mold and/or positioning them in it. The material forming the decorative layer and the ductile material are consequently arranged together in the cavity before the mold performs further working steps. In principle, it does not matter here whether the material for the decorative layer or the ductile material is first placed in the cavity and/or positioned in it, or even both of them at the same time.

After placing and/or positioning material for the decorative layer and ductile material, in a further process step the cavity of the injection mold is closed. After closing, a plastic molding compound forming the support of the molded part is injected into the cavity. This injected plastic molding compound solidifies (for example in the case of thermoplastic molding compounds) or cures (for example in the case of thermosetting molding compounds) and, together with the material forming the decorative layer and the ductile material for forming the ductile insert, forms the molded part to be produced.

The advantages of this process are, in particular, that the production of the molded part, which comprises a decorative layer, a support and a ductile insert, from the material for forming the decorative layer, from the plastic molding compound for forming the support and from the ductile material takes place in only one mold and with only one closing cycle of this mold. This is accomplished by both components, the material for forming the decorative layer and the ductile material, first being placed in the cavity of the injection mold and the injection mold being closed and the injection molding operation carried out only after that. Consequently, not just two of the three main components of the molded part are joined to one another, as in the case of the process described at the beginning, but all three main components simultaneously in this one production step. This consequently dispenses with the need for at least one process step; furthermore, the production of the molded part from the stated three components can take place on just one mold. This contributes considerably to increasing productivity and consequently to reducing production costs.

When introducing and/or positioning the materials, suitable fixing of the material for forming the decorative layer and/or the ductile material in the cavity of the injection mold is advantageously provided. Methods of doing this are known. For example, mechanically movable pins, for example with a diameter of approximately 5 mm, may act on protruding regions (scrap regions) as a holding device. However, indirect restraining systems may also be provided, for example the formation or arrangement of bores suitable for air to pass through or porous materials in the mold, by way of which the air is sucked away and the resultant negative pressure causes the material to be held against the mold.

According to a first development of the process, it is provided that the material forming the decorative layer is of a sheet-like form and/or is not yet of a form corresponding to its later form in the molded part when it is placed in the cavity and/or positioned in the cavity. For example, the sheet-like material, usually a laminar material comprising a decorative ply, is placed in the cavity of the injection mold and positioned there in its sheet-like form without any further deforming steps. It may just be necessary in advance for it to be cut to size and/or for passages to be formed or punched out and/or depressions to be introduced. The actual shaping to form the decorative layer of the molded part then takes place in the injection mold in conjunction with the forming of the entire molded part. The advantage is consequently in particular that the forming of the decorative layer also takes place on only one mold in the course of a joint operation, and consequently there is no longer any need prior to the actual production of the molded part for an operation for forming the decorative layer on a compression mold of its own, which brings about an additional increase in productivity.

In at least one implementation or variant, the placed-in and/or positioned material may in this case already be initially molded, to be precise in the direction of its later form in the molded part, when the cavity is closed, in particular by components of the mold and/or material applied to it. The mold usually comprises at least two mold parts, usually a nozzle side and an ejector side, which are moved together for the injection molding and form the cavity between them. For example, the material positioned in the cavity on the nozzle side may be pressed or bent into a shaping recess of the nozzle side when the mold is closed by protruding shaping components of the ejector side or material applied to it. As a result, the material is already molded in the direction of its final form as a molded decorative layer when the cavity is closed. This may prove to be advantageous in the actual shaping described below by the injection molding.

In the case of a further, alternative or additional implementation or variant of the first development of the process according to the invention, it is provided that, when injecting the plastic molding compound, the pressure emanating from the plastic molding compound presses the material against the cavity wall, and consequently the decorative layer of the molded part is formed in a form predetermined by the cavity wall. The cavity wall, in particular the shaping recess of the nozzle side of the mold, consequently represents a negative form of the intended form of the decorative side of the molded part to be produced. The material is pressed into this negative form by the injected plastic molding compound, which is under pressure, and it thereby takes on the intended form of the decorative layer. During the injection molding, consequently, not only the forming of the support but also the forming of the decorative layer takes place. Accordingly, this process can also be referred to as a transfer molding process or as a one-step process.

According to a second development of the process, as an alternative to the first development, it is provided that the material forming the decorative layer is preformed in a way corresponding to its later form in the molded part before placement in the cavity and/or before positioning in the cavity. This may take place for example in a compression mold. This preform of the material then corresponds to the form of the cavity of the injection mold during placement and/or positioning. The preformed material is also referred to as a decorative shell.

In the case of the process according to the invention, as an alternative or in addition to the developments described above, it may be provided according to a third development that the ductile material for forming the ductile insert is of a sheet-like form and/or is not yet of a form corresponding to its later form in the molded part when it is placed in the cavity and/or positioned in the cavity. For example, the sheet-like material, for example metal sheet or a nonmetallic mat, is placed in the cavity of the injection mold and positioned there in its sheet-like form without any further deforming steps. It may just be necessary in advance for it to be cut to size and/or for passages to be formed or punched out and/or depressions to be introduced. The actual shaping to form the ductile insert of the molded part then takes place in the injection mold in conjunction with the forming of the entire molded part. The advantage is consequently in particular that the forming of the insert also takes place on only one mold in the course of a joint operation, and consequently there is no longer any need prior to the actual production of the molded part for an operation for forming the insert on a compression mold of its own, which brings about an additional increase in productivity.

In an implementation or variant, the placed-in and/or positioned ductile material may in this case already be initially molded, to be precise in the direction of its later form in the molded part, when the cavity is closed, in particular by components of the mold and/or material applied to it. For example, the ductile material positioned in the cavity on the ejector side may be pressed or bent into a corresponding negative form of the ejector side when the mold is closed by protruding shaping components of the nozzle side or a material applied to it. As a result, the ductile material is already molded in the direction of its final form as a ductile insert when the cavity is closed. This may prove to be advantageous in the actual shaping described below by the injection molding.

In the case of a further, alternative or additional implementation or variant of the third development of the process according to the invention, it is provided that, when injecting the plastic molding compound, the pressure emanating from the plastic molding compound presses the ductile material against the cavity wall, and consequently the ductile insert of the molded part is formed in a form predetermined by the cavity wall. The cavity wall, in particular on the ejector side of the mold, consequently represents a negative form of the intended form of the ductile insert of the molded part to be produced. The ductile material, usually a metal sheet, is pressed into this negative form by the injected plastic molding compound, which is under pressure, and it thereby takes on the intended form of the insert.

According to a fourth development of the process, as an alternative to the third development, it is provided that the material forming the ductile insert is preformed in a way corresponding to its later form in the molded part before placement in the cavity and/or before positioning in the cavity. This may take place for example in a compression mold. This preform of the ductile material then corresponds to the form of the cavity of the injection mold during placement and/or positioning.

The plastic molding compound which forms the support of the molded part after the injection molding may be a thermoplastic, for example PE, PP, ABS, PA, PPA, or a polymer blend system, for example an ABS/PC blend, an elastomer or a thermoset.

In the injection molding of thermoplastics, the plastic molding compound is usually at a temperature of from approximately 250° C. to 260° C.; the mold itself is at a temperature of between 40° C. and 120° C., preferably approximately 80° C.

In the injection molding of thermosets, the plastic molding compound is usually cold, that is to say it is at approximately room temperature; the mold itself is at a temperature of between 80° C. and 180° C., preferably approximately 150° C.

Alternatively, according to a second variant, the process according to the invention for producing the molded parts mentioned at the beginning, in particular the aforementioned molded parts according to the invention, may also be a compression molding process. This involves placing a material forming the decorative layer, a plastic molding compound forming the support and the ductile material for forming the ductile insert in an opened mold space of a compression mold and/or positioning them in it. The material forming the decorative layer, the plastic molding compound and the ductile material are consequently arranged together in the opened mold space before the mold performs further working steps. In principle, it does not matter here whether the material for the decorative layer, the plastic molding compound or the ductile material is first placed in the opened mold space and/or positioned in it, or even all of them at the same time; the sequence is possibly dictated by the intended arrangement of the materials in the molded part. For example, the ductile material may have to be placed first in order that the plastic molding compound can then be arranged on it.

After placing and/or positioning material for the decorative layer and ductile material, in a further process step the mold space of the compression mold is closed. The material forming the decorative layer and/or the plastic molding compound forming the support and/or the ductile material for forming the ductile insert are in this case pressed into the form predetermined by the mold space. Subsequently, the plastic molding compound solidifies (for example in the case of thermoplastic molding compounds) or the plastic molding compound cures (for example in the case of thermosetting molding compounds) and, together with the material forming the decorative layer and the ductile material for forming the ductile insert, forms the molded part to be produced.

The advantages of this process are, in particular, that the production of the molded part, which comprises a decorative layer, a support and a ductile insert, from the material for forming the decorative layer, from the plastic molding compound for forming the support and from the ductile material, takes place in only one mold and with only one closing cycle or molding cycle of this mold. This is accomplished by all three components, the material for forming the decorative layer, the plastic molding compound and the ductile material, first being placed in the mold space of the compression mold and the compression mold being closed and the compression molding operation carried out only after that. Consequently, all three main components of the molded part are joined to one another in this one production step; a number of individual steps are not required. Furthermore, the production of the molded part from the stated three components can take place on just one mold. This contributes considerably to increasing productivity and consequently to reducing production costs.

The compression mold usually comprises at least two mold parts, an upper part and a lower part. These can be moved apart and together. Formed between the upper part and the lower part is the mold space, in the closed state of the upper part and the lower part a hollow space which is opened by moving the upper and lower parts apart, so that the individual components and materials can be placed in. When the upper part and the lower part are closed, the shaping compression-molding operation takes place. The form of the molded parts thereby created is determined by the form of the mold space, which represents a negative form of the mold part.

As a difference from the injection molding process, in which the mold is merely a filling mold which is closed before the actual operation, the injection molding, the mold in the compression molding process is a working mold, that is to say the shaping is performed by the closing movement of the mold.

When introducing and/or positioning the materials, suitable fixing of the material for forming the decorative layer and/or the plastic molding compound and/or the ductile material in the mold space of the compression mold is advantageously provided. Methods of doing this are known. For example, mechanically movable pins, for example with a diameter of approximately 5 mm, may act on protruding regions (scrap regions) as a holding device. However, indirect restraining systems may also be provided, for example the formation or arrangement of bores suitable for air to pass through or porous materials in the mold, by way of which the air is sucked away and the resultant negative pressure causes the material to be held against the mold.

According to a first development of the process, it is provided that the material forming the decorative layer is of a sheet-like form and/or is not yet of a form corresponding to its later form in the molded part when it is placed in the opened mold space and/or positioned in the opened mold space. For example, the sheet-like material, usually a laminar material comprising a decorative ply, is placed in the mold space of the compression mold and positioned there in its sheet-like form without any further deforming steps. It may just be necessary in advance for it to be cut to size and/or for passages to be formed or punched out and/or depressions to be introduced. The actual shaping to form the decorative layer of the molded part then takes place in the compression mold in conjunction with the forming of the entire molded part. The advantage is consequently in particular that the forming of the decorative layer also takes place on only one mold in the course of a joint operation, and consequently there is no longer any need prior to the actual production of the molded part for an operation for forming the decorative layer on a compression mold of its own, which brings about an additional increase in productivity.

In the case of an implementation or variant of the first development of the process according to the invention, it is provided that, when pressing the plastic molding compound by closing the compression mold, the pressure emanating from the plastic molding compound presses the material against the cavity wall, and consequently the decorative layer of the molded part is formed in a form predetermined by the cavity wall. The cavity wall, at least in certain portions, consequently represents a negative form of the intended form of the decorative side of the molded part to be produced. The material is pressed into this negative form by the pressed plastic molding compound, which is under pressure, and it thereby takes on the intended form of the decorative layer. During the compression molding, consequently, not only the forming of the support but also the forming of the decorative layer takes place. Accordingly, this process can also be referred to as a one-step process.

According to a second development of the process, as an alternative to the first development, it is provided that the material forming the decorative layer is preformed in a way corresponding to its later form in the molded part before placement in the mold space and/or before positioning in the mold space. This may take place for example in a compression mold. This preform of the material then corresponds to the form of the mold space of the compression mold during placement and/or positioning. The preformed material is also referred to as a decorative shell.

In the case of the process according to the invention, as an alternative or in addition to the developments described above, it may be provided according to a third development that the ductile material for forming the ductile insert is of a sheet-like form and/or is not yet of a form corresponding to its later form in the molded part when it is placed in the opened mold space and/or positioned in the opened mold space. For example, the sheet-like material, for example metal sheet or a nonmetallic mat, is placed in the opened mold space of the compression mold and positioned there in its sheet-like form without any further deforming steps. It may just be necessary in advance for it to be cut to size and/or for passages to be formed or punched out and/or depressions to be introduced. The actual shaping to form the ductile insert of the molded part then takes place in the compression mold in conjunction with the forming of the entire molded part. Here, too, the advantage is consequently in particular that the forming of the insert also takes place on only one mold in the course of a joint operation, and consequently there is no longer any need prior to the actual production of the molded part for an operation for forming the insert on a compression mold of its own, which brings about an additional increase in productivity.

In the case of an implementation or variant of the third development of the process according to the invention, it is provided that, when pressing the plastic molding compound by closing the compression mold, the pressure emanating from the plastic molding compound presses the ductile material against the mold space wall, and consequently the ductile insert of the molded part is formed in the form predetermined by the mold space wall. The mold space wall, at least in certain portions, consequently represents a negative form of the intended form of the ductile insert of the molded part to be produced. The ductile material, usually a metal sheet, is pressed into this negative form by the injected plastic molding compound, which is under pressure, and it thereby takes on the intended form of the insert.

According to a fourth development of the process, as an alternative to the third development, it is provided that the material forming the ductile insert is preformed in a way corresponding to its later form in the molded part before placement in the opened mold space and/or before positioning in the opened mold space. This may take place for example in a compression mold. This preform of the ductile material then corresponds to the form of the mold space of the compression mold during placement and/or positioning.

The plastic molding compound which forms the support of the molded part may be a BMC (bulk molding compound), an SMC (sheet molding compound) or a GRP (glass fiber reinforced plastic), for example a GMT (glass mat filled thermoplastic).

Depending on the type of plastic molding compound, the process is then referred to as BMC compression molding or BMC processing, or as SMC compression molding or SMC processing.

Thermoplastics, for example PP, ABS, PA, PPA, or a polymer blend system, for example an ABS/PC blend, elastomers or thermosets, for example based on a resin, for example based on unsaturated polyester resins, come into consideration as plastics of the plastic molding compound.

The plastic molding compound which is placed in the mold cavity of the compression mold with the material forming the decorative layer and the ductile material is substantially a kind of planar mat or a sheet.

In the case of all the processes according to the invention, it may be provided that the ductile material for forming the ductile insert is a metal sheet, in particular an aluminum or steel sheet. The ductile material may, however, also be or comprise a nonmetallic mat, in particular a textile mat or a prepreg mat.

In the case of all the processes according to the invention, it may also be provided that the ductile material for forming the ductile insert has one or more undercut first depressions and/or first apertures, into which the plastic molding compound penetrates during the injection molding or compression molding and, when it solidifies or cures, consequently forms a firm connection between the support formed by the plastic molding compound and the ductile insert. This also ensures stable and durable embedding or bonding of the ductile insert into or onto the molded part.

Furthermore, the ductile material may have at least a second aperture, through which plastic molding compound enters at least one portion of the mold adjoining the cavity or mold space during the injection molding or compression molding to form at least one fastening element on the support of the molded part, intended for attaching the molded part, in particular in the passenger compartment of a vehicle. This is made possible by fastening elements, for example elongated fastening pins or fastening areas with eyes which are formed in one piece with the support. During attachment in the passenger compartment of a vehicle, these fastening elements interact with corresponding fastening elements on the components onto which the molded parts are to be attached, for example with snap-in hooks and snap-in lugs, which correspond to the eyes of the fastening pins and fastening areas. Since these fastening elements penetrate through the ductile insert, they provide at the same time a firm connection between the support and the insert, and consequently stable and durable embedding or bonding of the insert into or onto the molded part.

After completion of the molded part in the injection mold or in the compression mold, it may be subjected to secondary finishing by further process steps. For example, cutting and/or grinding processes, working the visible surface of the decorative layer and/or the application of a surface coating, for example varnish or lacquer, may be envisaged.

In the case of the molded part according to the invention and in the case of all the processes according to the invention, it may be provided that the material forming the decorative layer is a composite material, in particular a laminar material, which comprises a decorative ply. The decorative ply may in this case be, for example, a wood veneer, a metal layer, a film or foil, preferably a plastic film and/or metal foil, and/or a textile layer or a fabric.

According to one variant, the material forming the decorative layer may comprise three plies; apart from the decorative ply, as further plies an adhesive layer and a protective layer, in particular a fiber-based textile mat or a nonwoven layer or a thermoplastic layer or a plastic- and/or fiber-based film or a veneer, said protective layer being bonded to the decorative layer by means of the adhesive layer. The protective layer prevents sensitive decorative plies, for example of wood veneer, film or textiles, from being damaged during the injection molding or compression molding operation on account of the pressure of the plastic molding compound. Without a protective layer, the high pressure of the molding compound could, for example, cause the decorative ply to tear. Furthermore, the protective layer also serves for creating the bond between the material forming the decorative layer and the plastic molding compound during the compression molding, and consequently for the bonding of the decorative layer to the support.

According to a further variant, the material forming the decorative layer may comprise two plies; apart from the decorative layer, also an adhesive layer. The adhesive layer forms a firm connection between the support formed by the plastic molding compound and the decorative layer during the pressing of the plastic molding compound and/or during the solidifying or curing of the plastic molding compound.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The invention is explained in more detail below, including with respect to further features and advantages, on the basis of the description of exemplary embodiments and with reference to the accompanying, schematic drawings, in which.

Figure 1A:
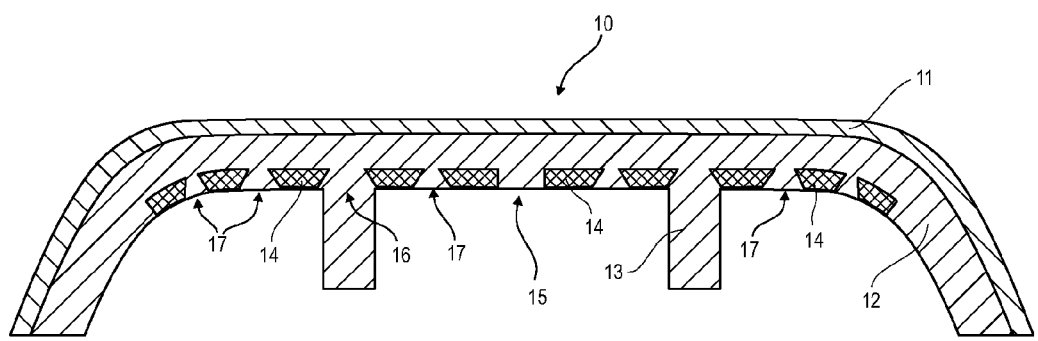
FIG. 1a and FIG. 1b respectively show an exemplary embodiment of a molded part according to the invention in a schematic cross-sectional representation.

Components and parts that correspond to one another are designated by the same reference numerals in the figures, even over different molds (respectively reference numeral 1) for the injection molding process and the compression molding process and the various molded parts made by them (respectively reference numeral 10).

DETAILED DESCRIPTION OF THE PREFERRED EMBODIMENTS

Figure 1B:
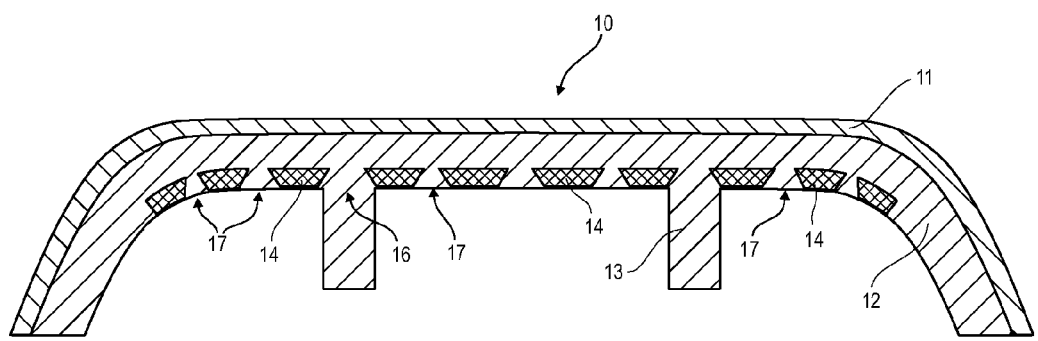
Figure 2A:
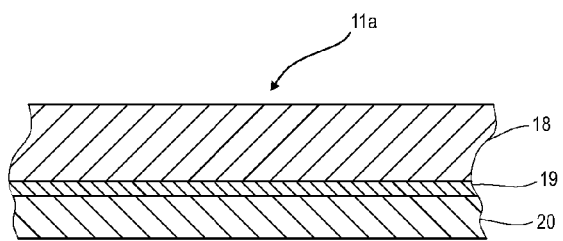
FIG. 2a shows a detail of an exemplary embodiment of a material for forming a decorative layer of the molded part in a schematic cross-sectional representation.
Figure 2B:
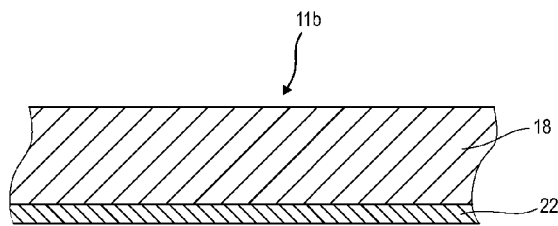
FIG. 2b shows a detail of an alternative exemplary embodiment of a material for forming a decorative layer of the molded part in a schematic cross-sectional representation.

FIG. 1a shows in a schematic cross-sectional representation a molded part 10 according to the invention that is produced by the injection molding process according to the invention in an injection mold 1 (see FIG. 3) and using a material 11a (see FIG. 2a) or a material 11b (see FIG. 2b). FIG. 1b shows in a comparable representation a molded part 10 according to the invention that is produced by the compression molding process according to the invention in the compression mold 1 according to FIG. 6 and using a material 11a (see FIG. 2a) or a material 11b (see FIG. 2b).

Both molded parts 10 (FIG. 1a and FIG. 1b) comprise a decorative layer 11 made from the material 11a, 11b on the side of the molded part 10 that is intended to be the visible side in a fitted state. Both molded parts 10 also have a support 12, formed by a plastic molding compound. As can be seen from FIG. 1a and FIG. 1b, embedded in the support 12 is a ductile insert 14, which in the molded part 10 according to the invention is formed by a ductile material 14a, to be precise by a nonmetallic mat, for example a textile mat or a prepreg met (see FIG. 4a to FIG. 4c as well as FIG. 5a to FIG. 5c as well as FIG. 7a and FIG. 7b as well as FIGS. 8a and 8b). Undercut apertures 17 in the ductile insert 14, into which the molding compound penetrates during production, are used for firmly connecting the insert 14 to the support 12.

Figure 3:
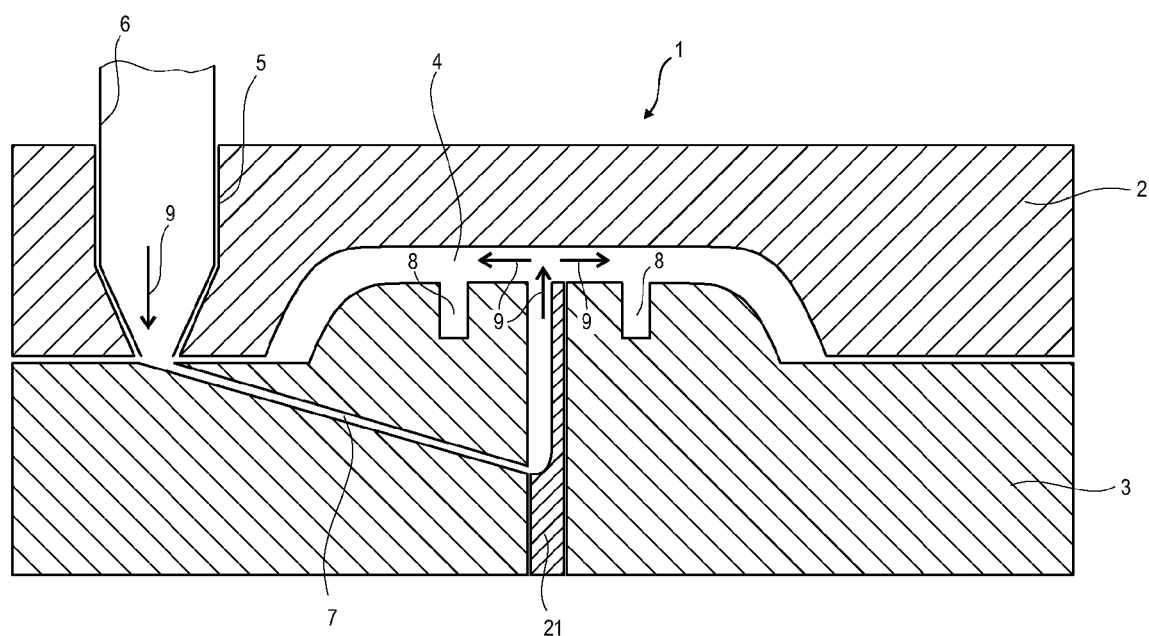
FIG. 3 shows an exemplary embodiment of an injection mold suitable for carrying out the process according to the invention in a schematic sectional representation.

The insert 14 in the molded part 10 that is shown in FIG. 1a also has a first aperture 15, by way of which the plastic molding compound is injected into the cavity 4 from a runner 7 of the injection mold 1 during production (see FIG. 3). It goes without saying that a number of such first apertures 15 and runners 7 interacting with them may also be provided. The molded part 10 that is shown in FIG. 1b does not have such apertures 15.

In both molded parts 10 (FIG. 1a and FIG. 1b), second apertures 16 are provided in the insert 14, by way of which plastic molding compound can penetrate into the mold portions 8 of the injection mold 1 (FIG. 3) or of the compression mold 1 (FIG. 6) and fill them during the injection molding or compression molding. After the molding compound has solidified or cured, this creates fastening elements, for example the fastening pins 13 represented in FIG. 1a/1b, by means of which the molded part 10 can be attached as a decorative part or trim part in a passenger compartment of a vehicle.

FIG. 2a and FIG. 2b respectively show in a schematic cross-sectional representation a detail of different materials 11a and 11b for forming a decorative layer 11 of the molded part 10 (see FIG. 1a/1b). Both materials 11a, 11b are of a sheet-like form and represent a laminar material. The upper layer 18 in both materials 11a, 11b, which in the finished molded part 10 forms a visible surface, is a decorative ply 18, for example a wood veneer and/or a metal layer and/or a film or foil, preferably a plastic film and/or metal foil, and/or a textile layer and/or a fabric.

The material 11a in FIG. 2a comprises three layers. The decorative ply 18, here in particular a wood veneer and/or a film or foil, preferably a plastic film and/or metal foil, and/or a textile layer and/or a fabric, is followed by an adhesive layer 19, which durably bonds a protective layer 20 to the decorative ply 18. This protective layer 20 prevents sensitive decorative plies 18, for example of wood veneer, film or textiles, from being damaged during the injection molding or compression molding operation on account of the pressure of the plastic molding compound. Furthermore, the protective layer 20 also serves for creating the bond between the material 11a and the plastic molding compound during the injection molding or compression molding, and consequently for the bonding of the decorative layer 11 to the support 12 in the molded part 10 (see FIG. 1a/1b). This bonding takes place by means of the plastic molding compound penetrating into the protective layer during the injection molding or compression molding or by direct interaction of the plastic molding compound with the protective layer 20. The provision of an adhesive or a dedicated adhesive layer is not required for this; the connection or bonding takes place without additional adhesives and is consequently adhesive-free. The protective layer 20 may be a fiber-based textile mat, for example of wood fiber, natural fiber or synthetic fibers. The protective layer 20 may also be a nonwoven layer or a thermoplastic layer or a plastic-and/or fiber-based film or a veneer.

The material 11b in FIG. 2b comprises two layers. The decorative ply 18, here in particular a metal layer and/or a film or foil, preferably a plastic film and/or metal foil, is followed by an adhesive layer 22, which in the finished molded part 10 provides the durable bond of the decorative layer 11 to the support 12 (see FIG. 1a/1b), that is to say represents an adhesion promoter for bonding the decorative layer to the support 12. For this purpose, the adhesive layer 22 forms an adhesive film in the finished molded part 10.

FIG. 3 shows an injection mold 1 suitable for carrying out the injection molding process according to the invention, and consequently for producing a molded part 10 corresponding to FIG. 1a. This mold comprises two parts, an upper part 2, also referred to as the nozzle side, and a lower part 3, also referred to as the ejector side. The representation is only schematic; the two parts usually each have a number of components or are made up of a number of components; for example, special ejectors (ejector bolts) or movable or removable components may be provided on undercut portions of the molded parts to be produced. It goes without saying that a nozzle or nozzles and/or an ejector or ejectors may also be attached to the other side, respectively, or that the nozzle side and the ejector side may also be interchanged. In FIG. 3, the upper part 2 and the lower part 3 have been closed. The two parts 2, 3 thereby form a hollow mold space 4, the so-called cavity 4, between them.

The cavity 4 represents a negative form of the molded part 10 to be produced with the injection mold 1 (see FIG. 1a). To produce the molded part 10, a plastic molding compound is injected into the cavity 4. For this purpose, the cavity is connected in the closed state of the injection mold 1 by way of a runner 7 in the lower part 3 of the injection mold 1 to a nozzle recess 5 in the upper part 2 of the injection mold 1. If, as represented in FIG. 3, an injection nozzle 6 is then introduced into the nozzle recess 5, this injection nozzle 6 can be used to inject molding compound under pressure into the runner 7 and the cavity 4. The direction of flow of the injected molding compound is schematically represented in FIG. 3 by the arrows 9. Part of the runner 7 is formed by an ejector 21, which after completion of the molded part 10 serves for ejecting the molded part.

The cavity 4 is adjoined in FIG. 3 by two mold portions 8 for forming the fastening elements 13 on the molded part 10 to be produced. It goes without saying that these mold portions 8, which are only schematically represented here, may have a form that is suitable or desired in the respective case, for example including a form with undercuts, which can be realized in the mold by means of correspondingly removable or movable components.

Figure 4A:
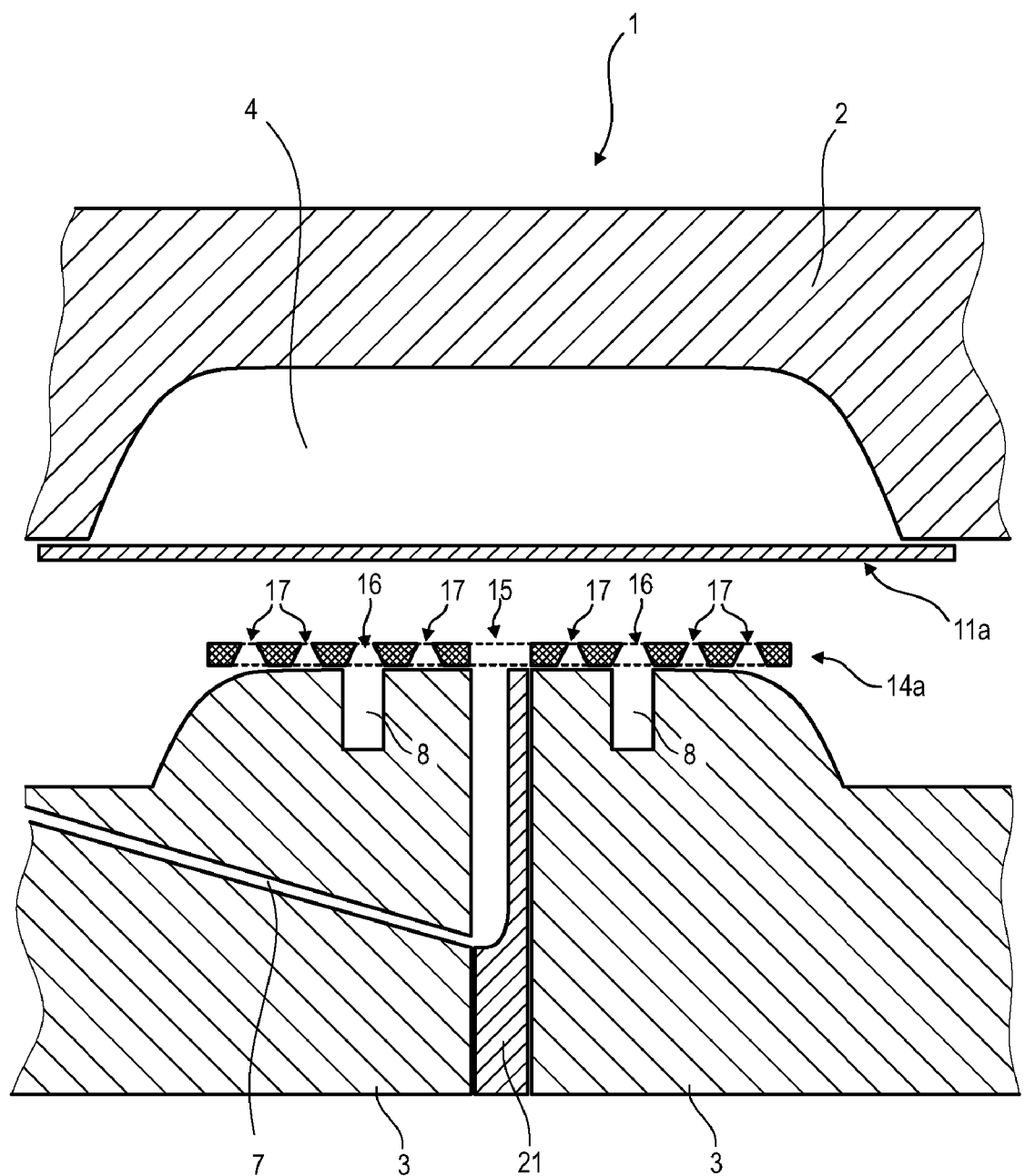
FIG. 4a to FIG. 4c respectively show successive process stages of an implementation or variant of the injection molding process according to the invention on the basis of a schematic cross-sectional representation of the injection mold according to FIG. 3.
Figure 4B:
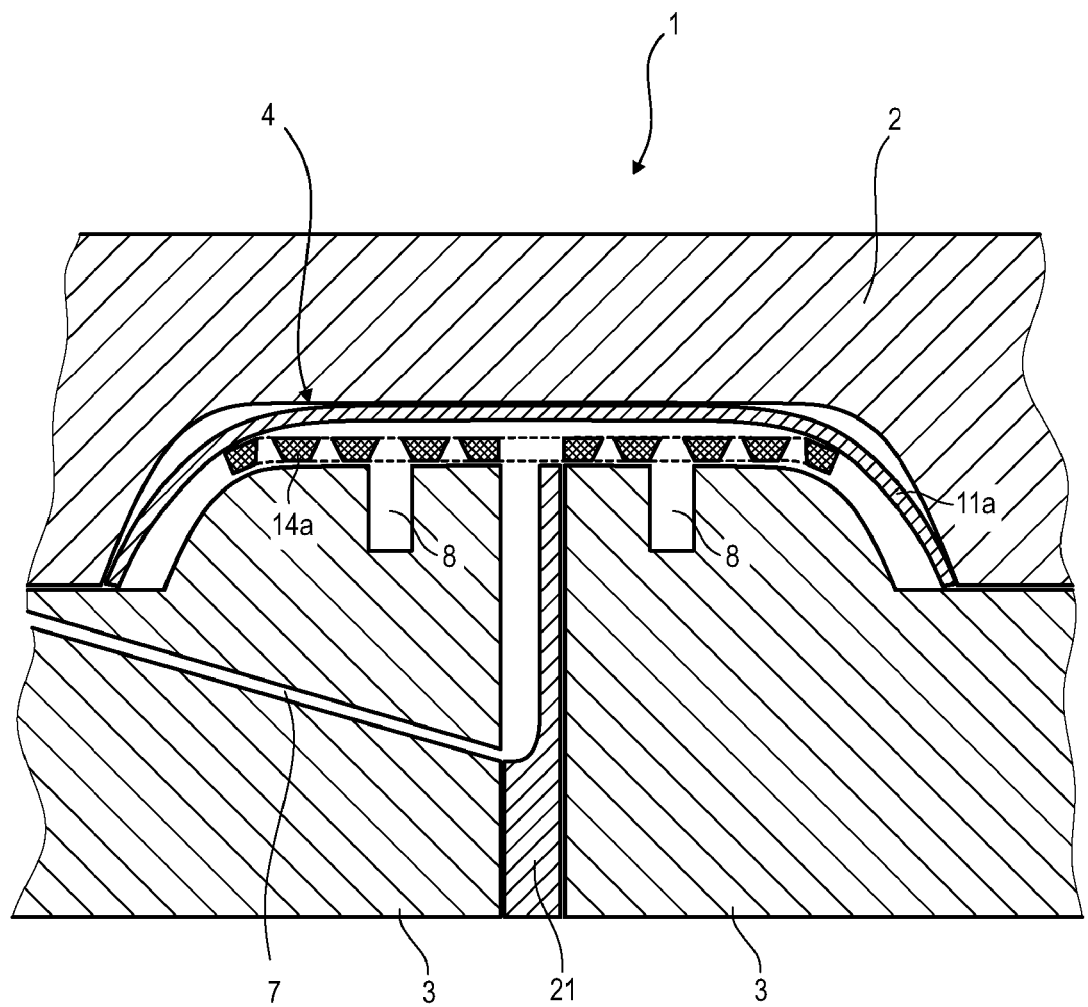
Figure 4C:
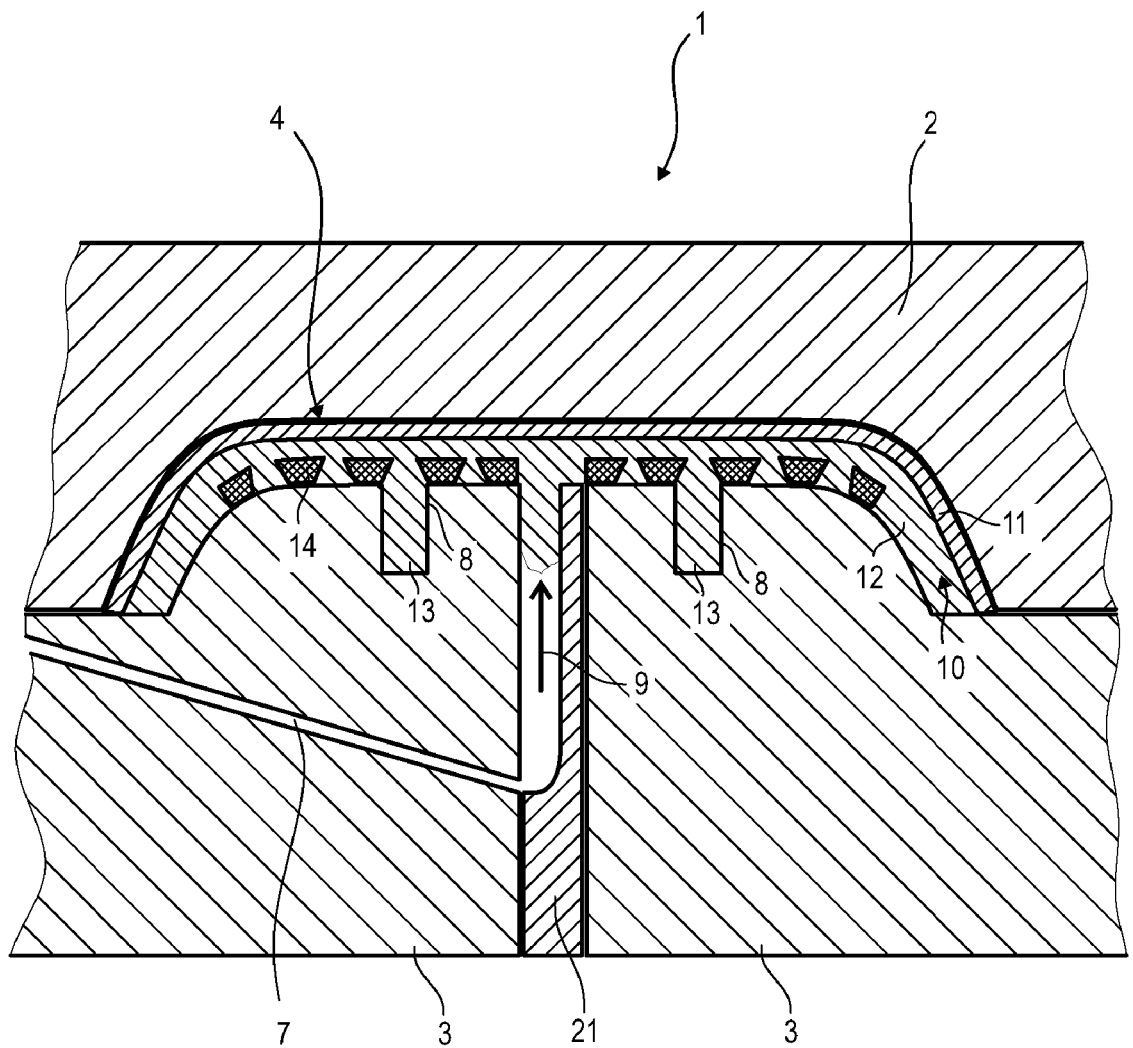
Figure 5A:
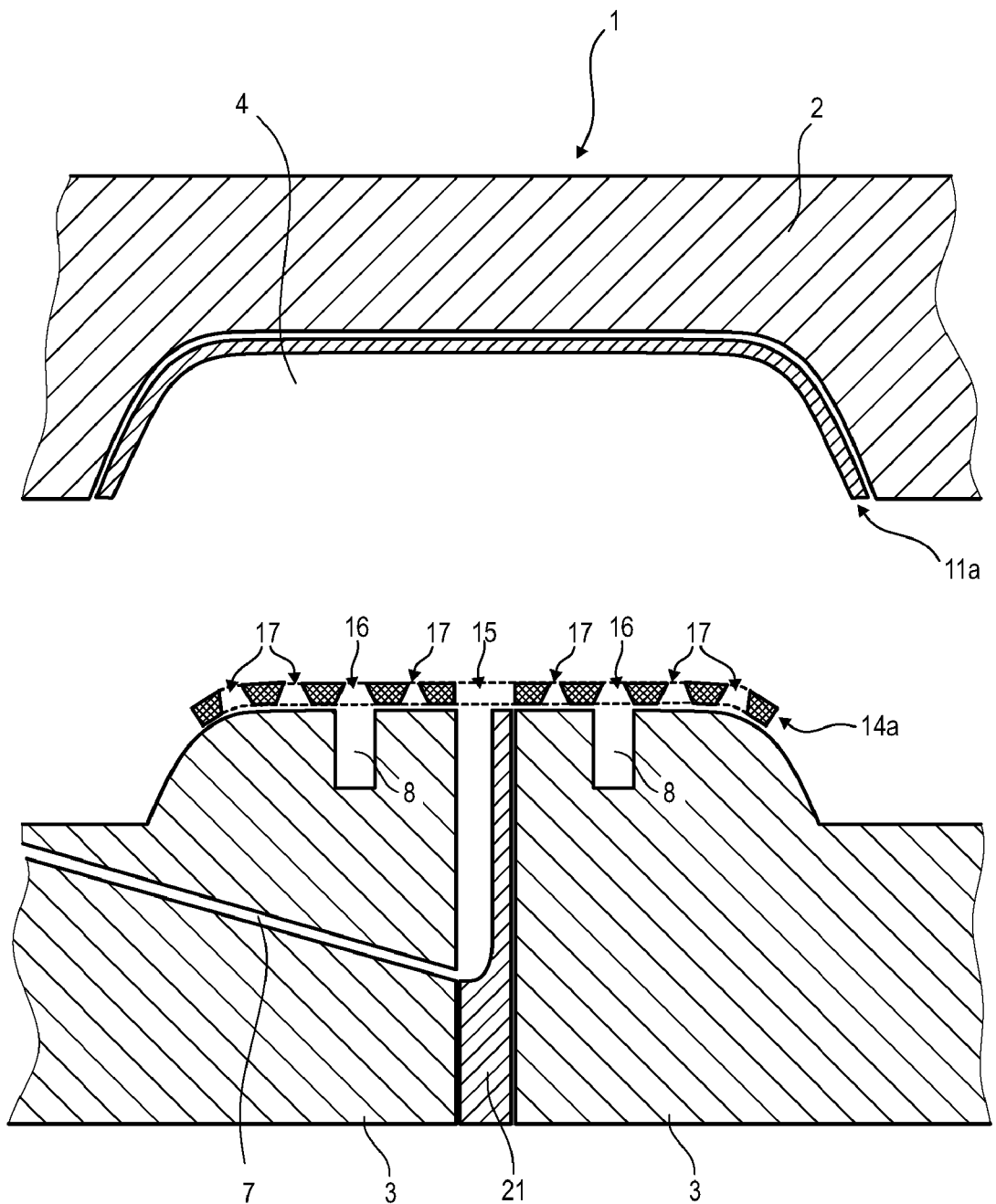
FIG. 5a to FIG. 5c respectively show successive process stages of an alternative implementation or variant of the injection molding process according to the invention on the basis of a schematic cross-sectional representation of the injection mold according to FIG. 3.
Figure 5B:
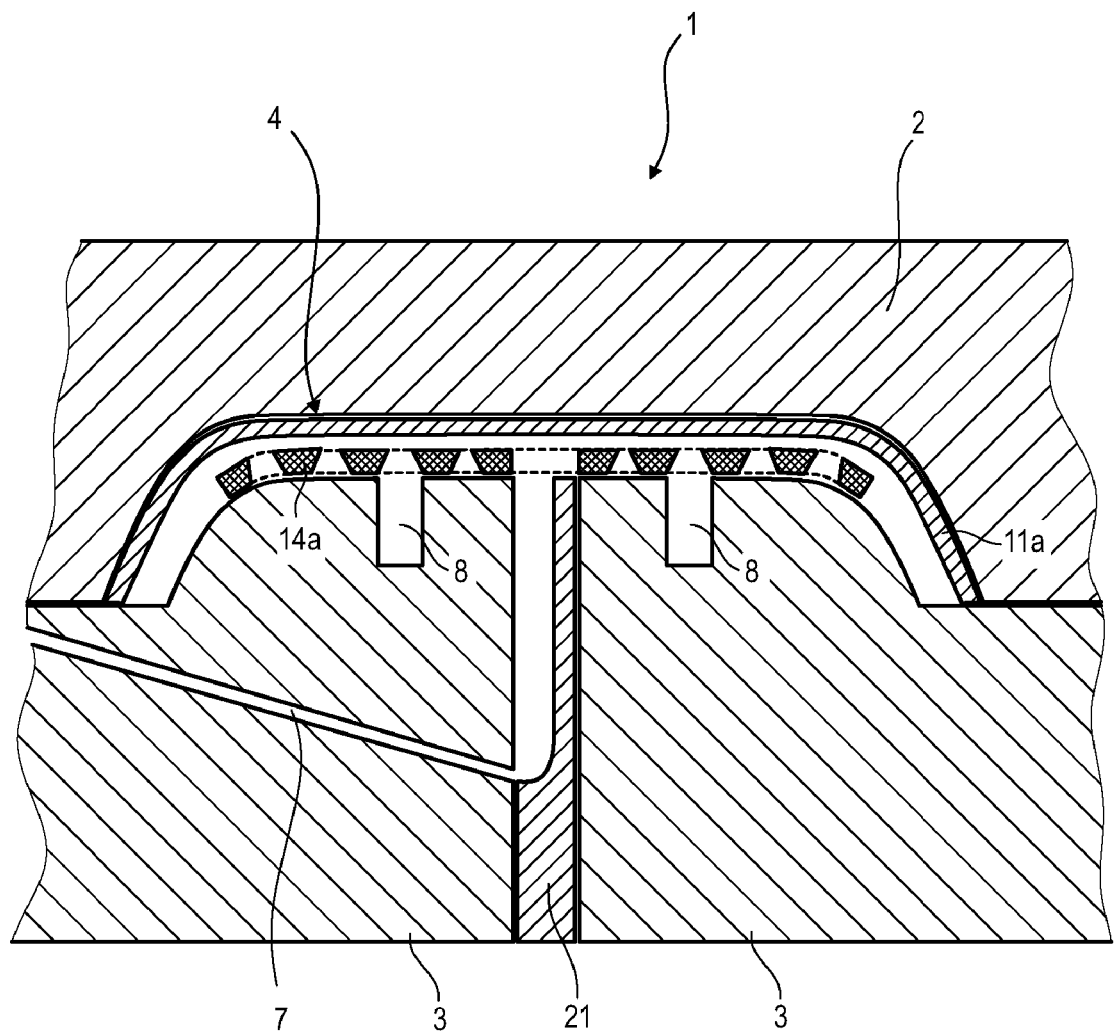
Figure 5C:
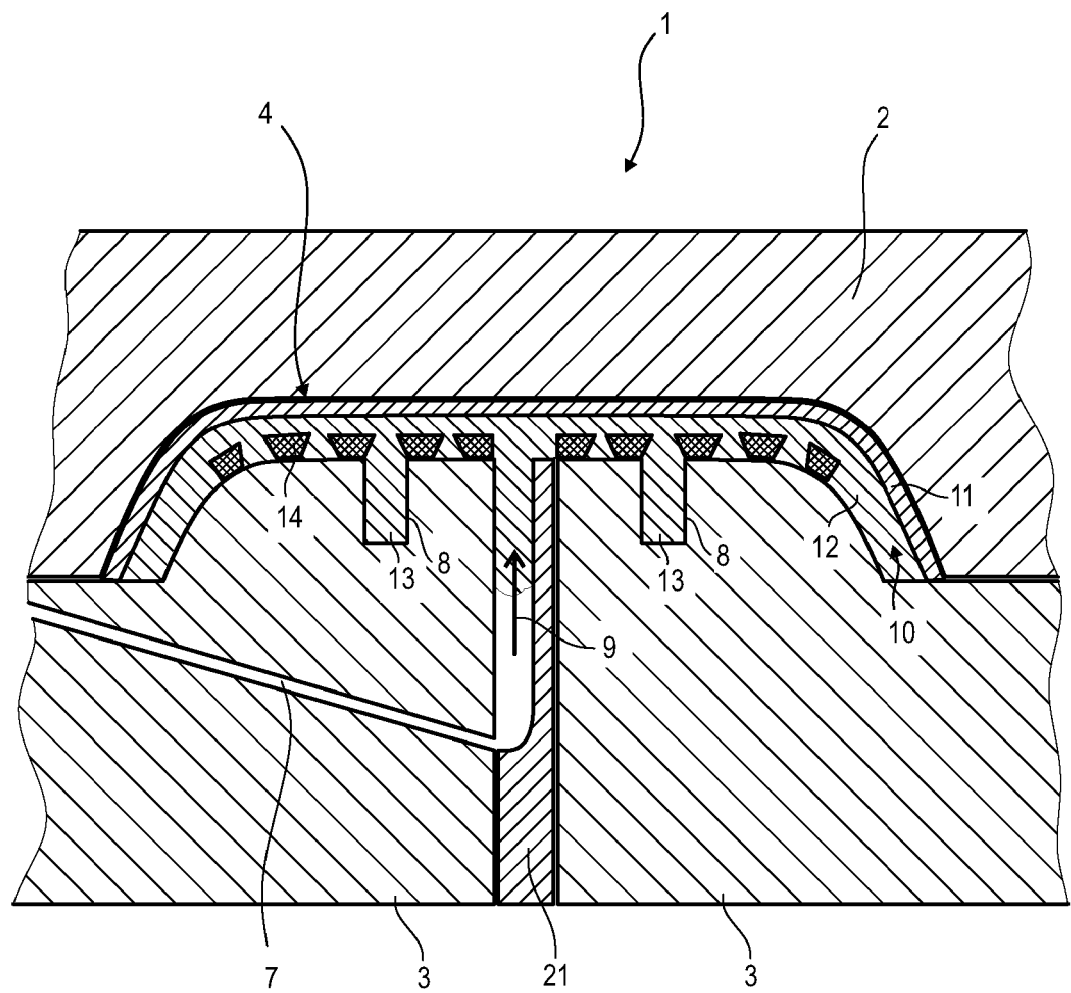

FIG. 4a to FIG. 4c and FIG. 5a to FIG. 5c show two different implementations or variants of the injection molding process according to the invention. Three successive process stages are respectively represented on the basis of a cross-sectional representation of a detail of the injection mold 1 according to FIG. 3. FIG. 4a and FIG. 5a show the injection mold 1 in an opened state, i.e., the upper part 2 and the lower part 3 have been moved apart and the cavity 4 is accessible. In FIG. 4b and FIG. 5b, the upper part 2 and the lower part 3 have been closed; the injection mold 1 is ready for the injection molding operation. In FIG. 4c and FIG. 5c, the injection molding operation has been completed; the direction of flow of the molding compound just injected is still schematically indicated by the arrow 9.

The process according to FIGS. 4a to 4c comprises the following steps:
  a) Providing the sheet-like, not yet preformed, but possibly cut-to-size and/or pre-punched or pre-milled or pre-drilled material 11a for forming the decorative layer 11.
  b) Providing the sheet-like, not yet preformed, but possibly cut-to-size and/or pre-punched or pre-milled or pre-drilled ductile material 14a for forming the ductile insert 14.
  c) Placing and positioning the sheet-like material 11a for forming the decorative layer 11 and the sheet-like ductile material 14a for forming the ductile insert 14 in the cavity 4 of the injection mold 1. In particular, this may involve fixing the material 11a to the upper part 2 and the ductile material 14a to the lower part 3 of the injection mold 1. The first aperture 15 is in this case arranged over the opening of the runner 7 and the second apertures 16 are arranged over the mold portions 8 in the lower part 3. This process stage is represented in FIG. 4a.
  d) Closing the cavity 4, i.e., closing the injection mold 1, by the upper part 2 and the lower part 3 being moved together. In this case, both the material 11a for forming the decorative layer 11 and the ductile material 14a are initially molded in the direction of their later form in the molded part 10. This process stage is represented in FIG. 4b.
  e) Injecting the plastic molding compound forming the support into the cavity, by way of the injection nozzle 6 and the runner 7. The pressure thereby emanating from the plastic molding compound causes the material 11a for forming the decorative layer 11 and/or the ductile material 14a to be pressed against the wall of the cavity 4 and thereby take on its intended form for the finished molded part. This process stage is represented in FIG. 4c.
  f) Solidifying or curing the injected plastic molding compound, whereby the support 12 is formed. Altogether, the firmly bonded-together composite comprising the decorative layer 11, the support 12 and the ductile insert 14 forms as a result, and consequently the molded part 10 to be produced according to FIG. 1a.
  g) Finally, the molded part 10 can be ejected from the injection mold 1 and possibly also subjected to secondary finishing, for example by cutting and/or grinding and/or by the application of a surface coating, for example a varnish or lacquer.

The process according to FIG. 5a to FIG. 5c comprises the following steps:
  a) Providing the material 11a, preformed in a way corresponding to its later form as a decorative layer 11 in the molded part 10. The performing may take place for example in a compression mold.
  b) Providing the ductile material 14a, preformed in a way corresponding to its later form as a ductile insert 14 in the molded part 10. The performing may take place for example in a compression mold.
  c) Placing and positioning the preformed material 11a for forming the decorative layer 11 and the preformed ductile material 14a for forming the ductile insert 14 in the cavity 4 of the injection mold 1. In particular, this may involve fixing the material 11a to the upper part 2 and the ductile material 14a to the lower part 3 of the injection mold 1. The first aperture 15 is in this case arranged over the opening of the runner 7 and the second apertures 16 are arranged over the mold portions 8 in the lower part 3. This process stage is represented in FIG. 5a. The form of the material 11a and the form of the ductile material 14a corresponds here to the form of the cavity 4 of the injection mold 1.
  d) Closing the cavity 4, i.e., closing the injection mold 1, by the upper part 2 and the lower part 3 being moved together. No further molding of the material 11a for forming the decorative layer 11 and the ductile material 14a occurs as this happens. This process stage is represented in FIG. 5b.
  e) Injecting the plastic molding compound forming the support into the cavity, by way of the injection nozzle 6 and the runner 7. No further molding of the material 11a and the ductile material 14a occurs as this happens; the material 11a and ductile material 14a are already in their final form. The injection molding operation consequently only serves as preparation for the forming of the support 12. This process stage is represented in FIG. 5c.
  f) Solidifying or curing the injected plastic molding compound, whereby the support 12 is formed. Altogether, the firmly bonded-together composite comprising the decorative layer 11, the support 12 and the ductile insert 14 forms as a result, and consequently the molded part 10 to be produced according to FIG. 1a.
  g) Finally, the molded part 10 can be ejected from the injection mold 1 and possibly also subjected to secondary finishing, for example by cutting and/or grinding and/or by the application of a surface coating, for example a varnish or lacquer.

In a further alternative variant of the injection molding process, it is also possible for only the material 11a for forming the decorative layer 11 to be preformed and for the ductile material 14a to be in a sheet-like form, in a way corresponding to the process that is shown in FIG. 4a to FIG. 4c. Or only the ductile material 14a is preformed and the material 11a is in a sheet-like form, in a way corresponding to the process that is shown in FIG. 4a to FIG. 4c. The individual process steps in both cases follow directly from the explanations of the variants of the process that are shown in FIG. 4a to 4c and FIG. 5a to FIG. 5c.

Figure 6:
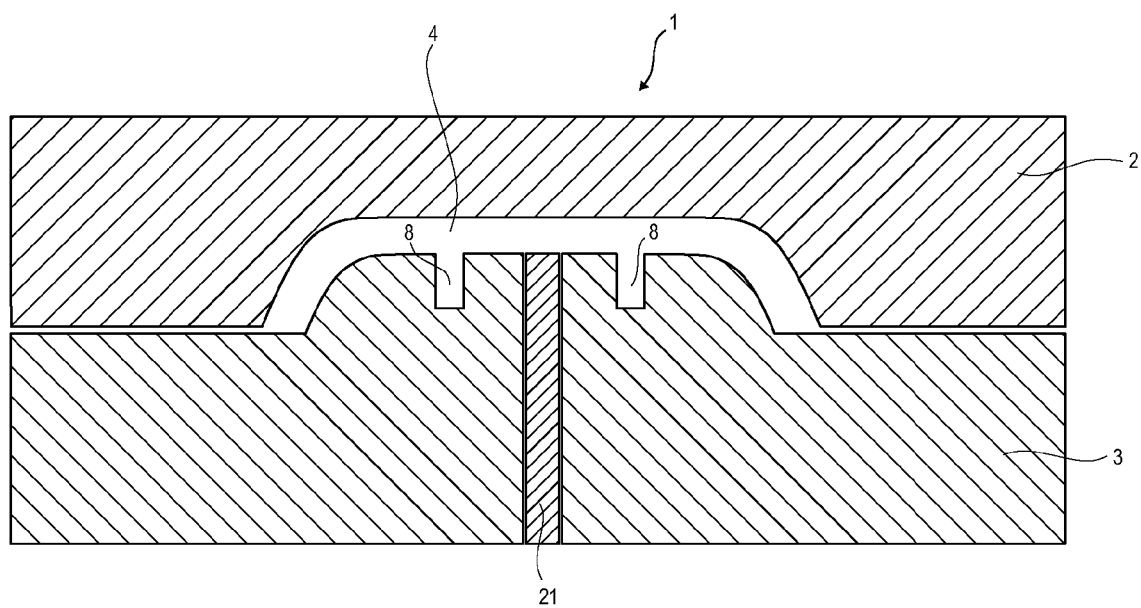
FIG. 6 shows an exemplary embodiment of compression mold suitable for carrying out the process according to the invention in a schematic cross-sectional representation.

FIG. 6 shows a compression mold 1 that is suitable for carrying out the compression molding process according to the invention, and consequently for producing the molded part 10 in a way corresponding to FIG. 1b. This is merely a schematic representation; it may, for example, also be a positive mold. Like the injection mold 1 that is shown in FIG. 3, the compression mold 1 comprises two parts, an upper part 2 and a lower part 3. The representation is only schematic; the two parts usually each have a number of components or are made up of a number of components; for example, special ejectors (ejector bolts) or movable or removable components may be provided on undercut portions of the molded parts to be produced.

The production of a molded part with this compression mold 1 takes place in principle by a molding compound being placed between the upper part 2 and the lower part 3 when the mold 1 is open and the upper part 2 and the lower part 3 subsequently being moved together and the molded part formed as a result by corresponding pressing. After the pressing of the molded part, the molded part is removed from the mold 1 with the aid of an ejector 21.

In FIG. 6, the upper part 2 and the lower part 3 have been closed. The two parts 2, 3 thereby form a hollow space, the mold space 4, between them (comparable to the cavity 4 in the injection mold 1 according to FIG. 3). This determines the form of the molded part produced with the mold 1. The mold space 4 consequently represents a negative form of a molded part 10 to be produced with the compression mold 1 (see FIG. 1b).

The mold space 4 is adjoined in FIG. 6 by two mold portions 8 for forming in each case a fastening element on the molded part 10 to be produced. It goes without saying that these mold portions 8, which are only schematically represented here, may have a form that is suitable or desired in the respective case, for example including a form with undercuts, which can be realized in the mold by means of correspondingly removable or movable components.

Figure 7A:
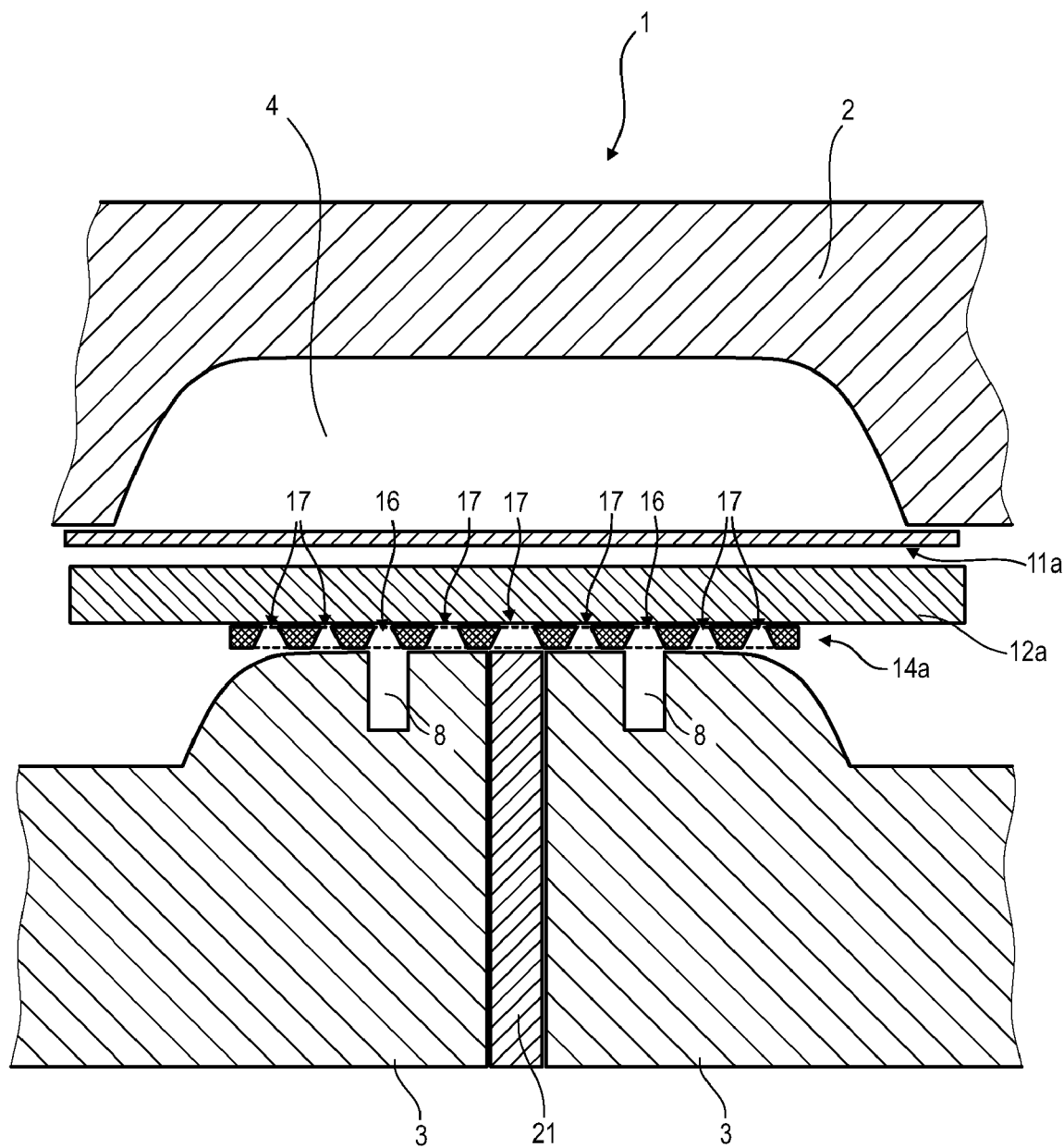
FIG. 7a and FIG. 7b respectively show successive process stages of an implementation or variant of the compression molding process according to the invention on the basis of a schematic cross-sectional representation of the compression mold according to FIG. 6.
Figure 7B:
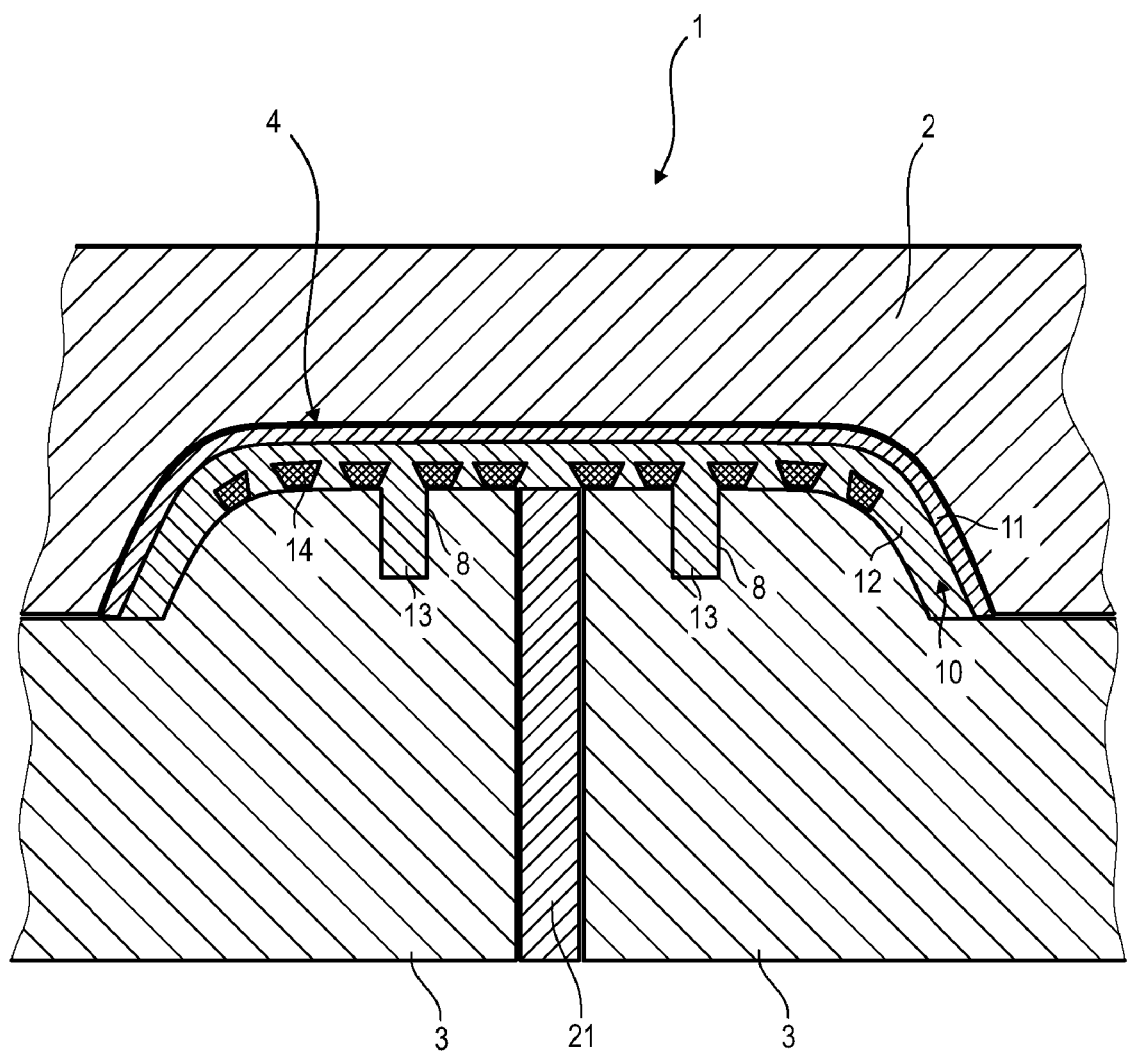
Figure 8A:
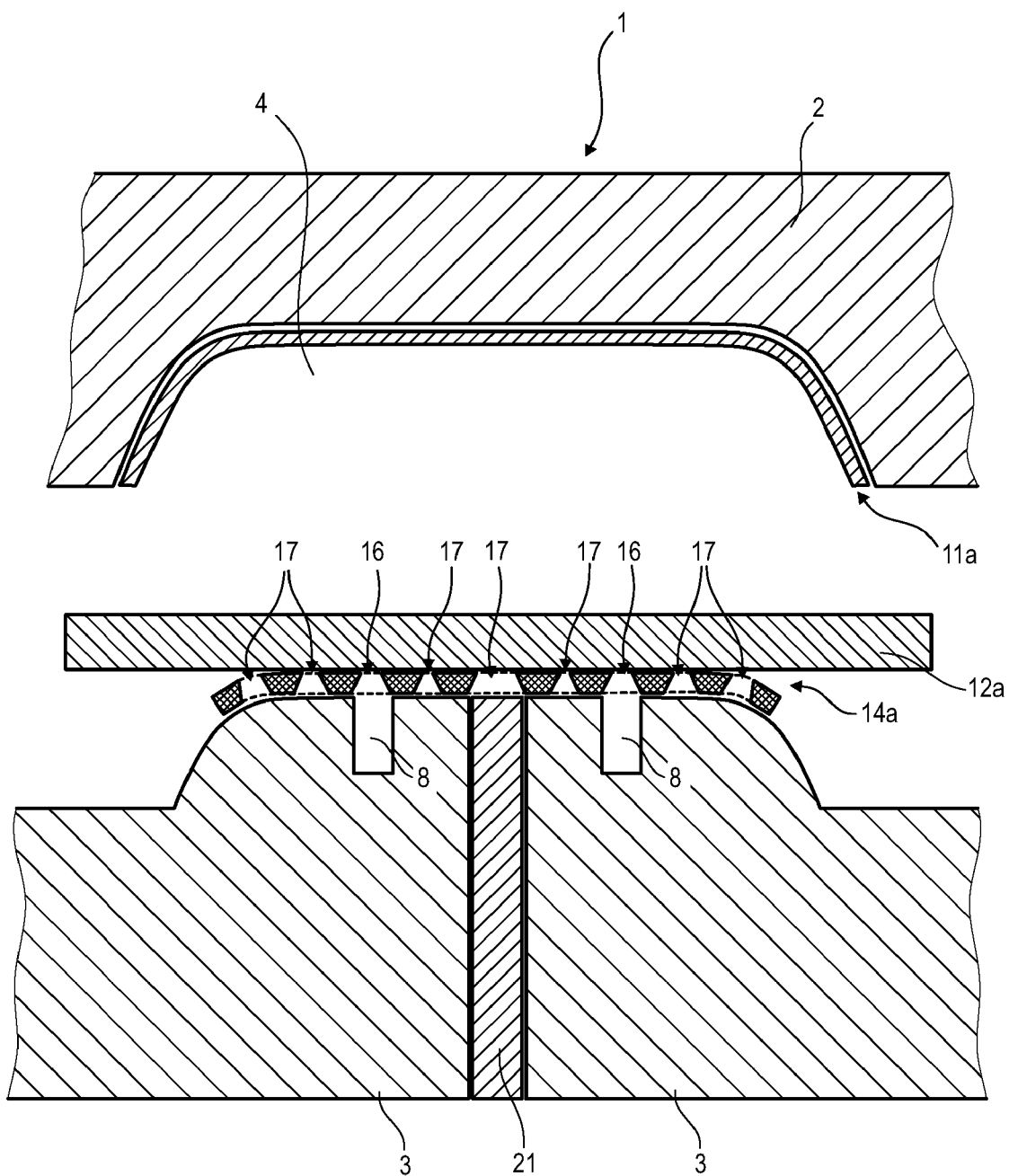
FIG. 8a and FIG. 8b respectively show successive process stages of an alternative implementation or variant of the compression molding process according to the invention on the basis of a schematic cross-sectional representation of the compression mold according to FIG. 6.
Figure 8B:
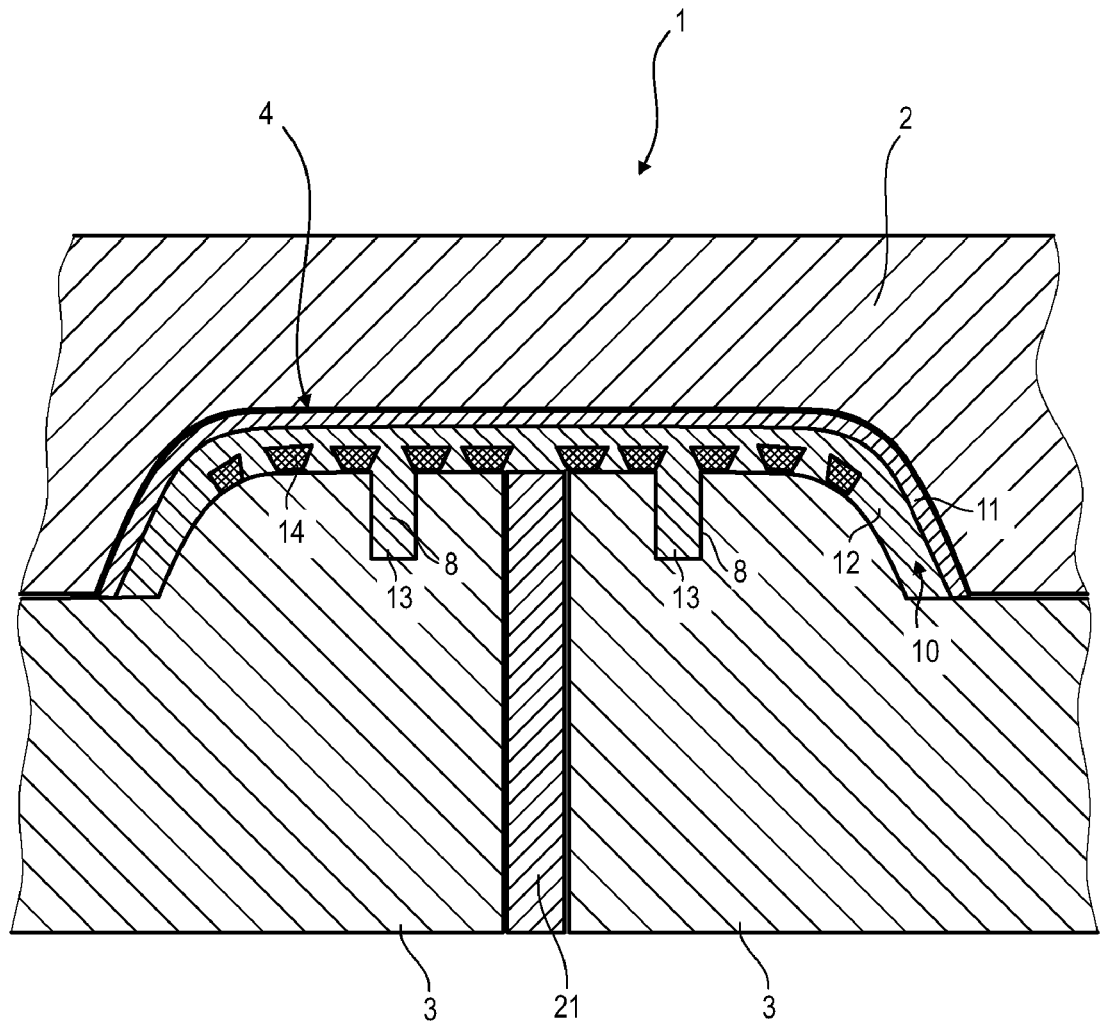

FIG. 7a and FIG. 7b and FIG. 8a and FIG. 8b show two different implementations or variants of the compression molding process according to the invention. Two successive process stages are respectively represented on the basis of a cross-sectional representation of a detail of the compression mold 1 according to FIG. 6. FIG. 7a and FIG. 8a show the compression mold 1 in an opened state, i.e., the upper part 2 and the lower part 3 have been moved apart and the cavity 4 is accessible. In FIG. 7b and FIG. 8b, the compression molding operation has been completed; the upper part 2 and the lower part 3 have been moved together and, as a result, the molded part pressed in the desired form from the placed components. The compression mold 1 is accordingly respectively closed in FIG. 7b and FIG. 8b.

The process according to FIG. 7a and FIG. 7b comprises the following steps:
a) Providing a sheet-like, not yet preformed, but possibly cut-to-size and/or pre-punched or pre-milled or pre-drilled material 11a for forming the decorative layer 11.
b) Providing a sheet-like, not yet preformed, but possibly cut-to-size and/or pre-punched or pre-milled or pre-drilled ductile material 14a for forming the ductile insert 14.
c) Providing a plastic molding compound 12a for forming the support 12.
d) Placing and positioning the sheet-like material 11a for forming the decorative layer 11, the plastic molding compound 12a forming the support 12 and the sheet-like ductile material 14a for forming the ductile insert 14 in the mold space 4 of the compression mold 1. In particular, this may involve fixing the material 11a to the upper part 2 and the ductile material 14a to the lower part 3 of the compression mold 1; the plastic molding compound 12a may be arranged on and/or alongside the ductile material 14a. The second apertures 16 in the ductile material 14a are in this case arranged over the mold portions 8 in the lower part 3. This process stage is represented in FIG. 7a.
e) Closing the mold space 4, i.e., closing the compression mold 1, by the upper part 2 and the lower part 3 being moved together. The pressing pressure thereby created causes the plastic molding compound 12a, and with it both the material 11a for forming the decorative layer 11 and the ductile material 14a, to be pressed into the predetermined form. The actual shaping takes place by the material 11a for forming the decorative layer 11 and/or the ductile material 14a and/or the plastic molding compound 12a being pressed against the wall of the mold space 4 and thereby take on their intended form for the finished molded part. This process stage is represented in FIG. 7b.
f) Solidifying or curing the plastic molding compound 12a, whereby the support 12 is formed. Altogether, the firmly bonded-together composite comprising the decorative layer 11, the support 12 and the ductile insert 14 forms as a result, and consequently the molded part 10 to be produced according to FIG. 1b.
g) Finally, the molded part 10 can be ejected from the compression mold 1 and possibly also subjected to secondary finishing, for example by cutting and/or grinding and/or by the application of a surface coating, for example a varnish or lacquer.

The process according to FIGS. 8a and 8b comprises the following steps:
a) Providing the material 11a, preformed in a way corresponding to its later form as a decorative layer 11 in the molded part 10. The preforming may take place for example in a compression mold.
b) Providing the ductile material 14a, preformed in a way corresponding to its later form as a ductile insert 14 in the molded part 10. The preforming may take place for example in a compression mold.
c) Providing a plastic molding compound 12a for forming the support 12.
d) Placing and positioning the preformed material 11a for forming the decorative layer 11 and the preformed ductile material 14a for forming the ductile insert 14 in the mold space 4 of the compression mold 1. In particular, this may involve fixing the material 11a to the upper part 2 and the ductile material 14a to the lower part 3 of the compression mold 1. The second apertures 16 are in this case arranged over the mold portions 8 in the lower part 3. The form of the material 11a and the form of the ductile material 14a correspond here to the form of the mold space 4 of the compression mold 1. The plastic molding compound 12a is arranged between the ductile material 14a and the material 11a, generally on the ductile material 14a. This process stage is represented in FIG. 8a.
e) Closing the mold space 4, i.e., closing the compression mold 1, by the upper part 2 and the lower part 3 being moved together. The pressing pressure thereby created causes the plastic molding compound 12a to be pressed into the predetermined form. No further molding of the material 11a and the ductile material 14a occurs as this happens; the material 11a and ductile material 14a are already in their final form. The compression molding operation consequently only serves for the forming of the support 12. This process stage is represented in FIG. 8b.
f) Solidifying or curing the plastic molding compound, whereby the support 12 is formed. Altogether, the firmly bonded-together composite comprising the decorative layer 11, the support 12 and the ductile insert 14 forms as a result, and consequently the molded part 10 to be produced according to FIG. 1b.
g) Finally, the molded part 10 can be ejected from the compression mold 1 and possibly also subjected to secondary finishing, for example by cutting and/or grinding and/or by the application of a surface coating, for example a varnish or lacquer.

In a further alternative variant of the compression molding process, it is also possible for only the material 11a for forming the decorative layer 11 to be preformed and for the ductile material 14a to be in a sheet-like form, in a way corresponding to the process that is shown in FIG. 7a to FIG. 7b. Or only the ductile material 14a is preformed and the material 11a is in a sheet-like form, in a way corresponding to the process that is shown in FIG. 7a to FIG. 7b. The individual process steps in both cases follow directly from the explanations of the variants of the process that are shown in FIGS. 7a and 7b and FIG. 8a and FIG. 8b.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

LIST OF DESIGNATIONS 1 mold, injection mold or compression mold
2 nozzle side, upper part of the mold 1
3 ejector side, lower part of the mold 1
4 cavity, hollow mold space, mold space of the mold 1
5 nozzle recess
6 injection nozzle
7 runner
8 mold portion for forming a fastening element
9 direction of flow of the injected plastic molding compound
10 molded part
11 decorative layer
11a material for forming the decorative layer 11
11b material for forming the decorative layer 11
12 support
12a plastic molding compound for forming the support 12
13 fastening element, fastening pin
14 ductile insert
14a ductile material for forming the ductile insert 14
15 first aperture
16 second aperture
17 undercut aperture
18 decorative ply, upper layer
19 adhesive layer
20 protective layer
21 ejector
22 adhesive layer

We claim:

1. An injection molding process for producing molded trim parts for the passenger compartment of a vehicle, the molded trim parts comprising a support of plastic, a decorative layer and a ductile insert of ductile material, comprising the steps for:
 a) placing a material forming the decorative layer and the ductile material for forming the ductile insert in an opened cavity of an injection mold, wherein the ductile material for forming the ductile insert is of a sheet-like form, and is in a preliminary form relative to its later form when the ductile material is placed in the cavity;
 b) closing the cavity, wherein the placed-in ductile material is initially molded in the direction of its later form in the molded part when the cavity is closed;
 c) injecting a plastic molding compound forming the support into the cavity, wherein the plastic molding compound flows through the ductile material in its later form; and
 d) solidifying or curing the injected plastic molding compound, the latter acting together with the material forming the decorative layer and the ductile material for forming the ductile insert to form the molded part.

2. The process as claimed in claim 1, wherein the material forming the decorative layer is one of a sheet-like form, or of a preliminary form relative to its later form in the molded part when the material is placed in the cavity.

3. The process as claimed in claim 2, wherein the placed-in material forming the decorative layer is initially molded in the direction of its later form in the molded part when the cavity is closed.

4. The process as claimed in claim 2, wherein:
 when injecting the plastic molding compound, the pressure emanating from the plastic molding compound presses the material forming the decorative layer against the cavity wall; and
 consequently the decorative layer of the molded part is formed in a form predetermined by the cavity wall.

5. The process as claimed in claim 1, wherein the ductile material for forming the ductile insert has at least a first aperture, through which the plastic molding compound is injected into the cavity after the placement in the cavity.

6. The process as claimed in claim 1, wherein the ductile material for forming the ductile insert comprises one of a metal or a nonmetallic mat.

7. The process as claimed in claim 1, wherein the ductile material for forming the ductile insert has at least a second aperture, wherein plastic molding compound enters through at least the second aperture into at least one mold portion of the mold adjoining the cavity to form at least one fastening element on the support of the molded part, intended for the attachment of the molded part.

8. The process as claimed in claim 1, wherein the ductile material has one or more undercut depressions and/or apertures, into which the plastic molding compound penetrates and, when it cures, forms a firm connection between the support formed by the plastic molding compound and the ductile insert.

* * * * *